April 21, 1959
D. L. ARENBERG
2,883,660
ULTRASONIC APPARATUS
Filed Oct. 27, 1953
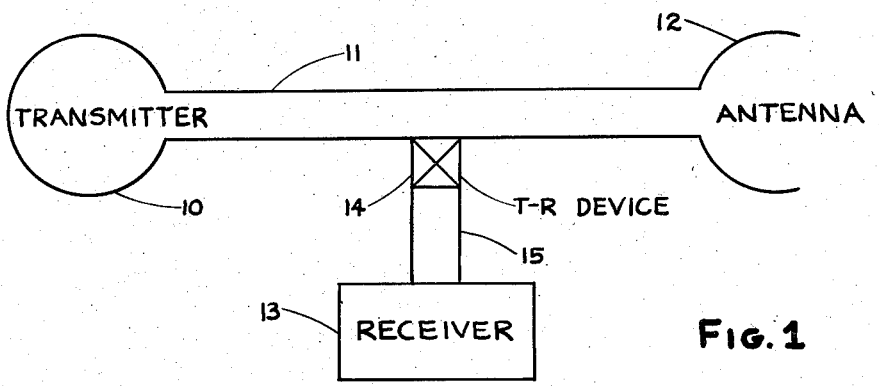
FIG. 1
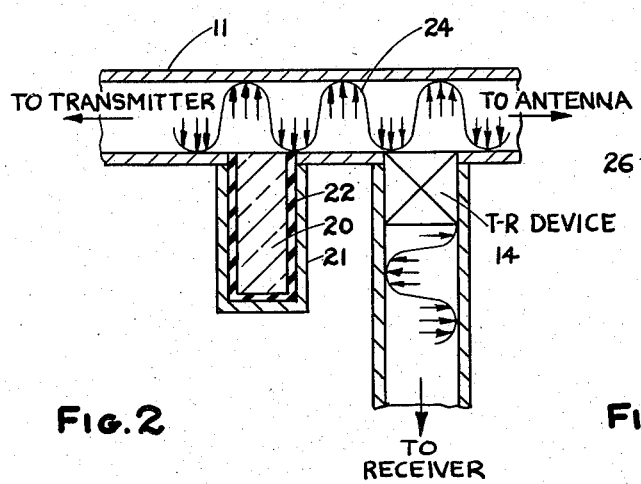
FIG. 2
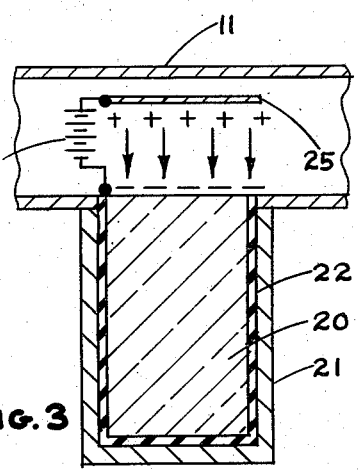
FIG. 3
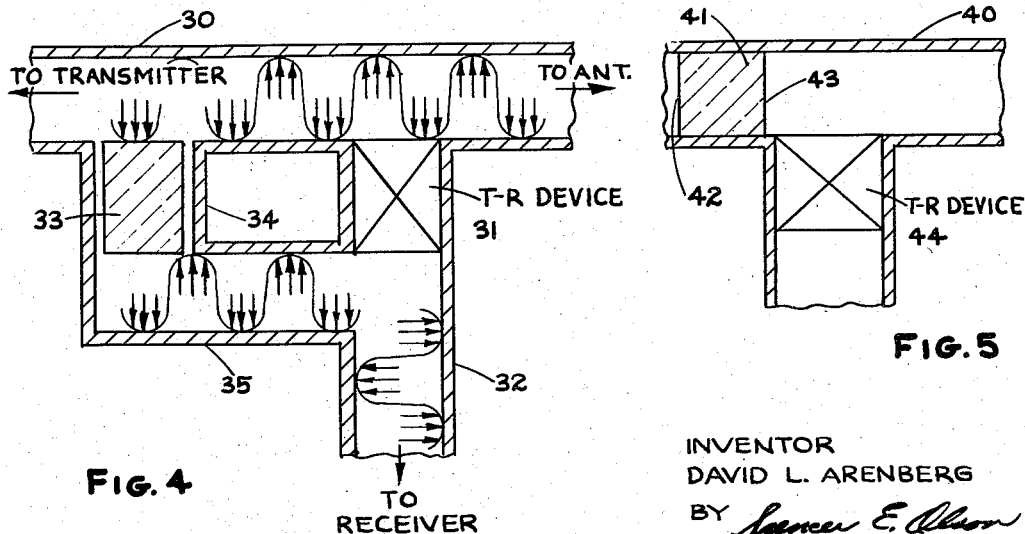
FIG. 4
FIG. 5
INVENTOR
DAVID L. ARENBERG
BY *Spencer E. Olson*
ATTORNEY

United States Patent Office 2,883,660
Patented Apr. 21, 1959

2,883,660

ULTRASONIC APPARATUS

David L. Arenberg, Boston, Mass.

Application October 27, 1953, Serial No. 388,579

27 Claims. (Cl. 343—17.7)

This invention relates to wave translation apparatus adapted for use at very high frequencies, and more particularly to apparatus adapted for use in wave guide systems for generating ultrasonic waves in response to the signals transmitted in the system.

Ultrasonic devices have for some time been employed in electronic systems as timing elements (e.g., delay lines), and as memory devices, but their use has been limited to relatively low frequencies, due to the inherent mechanical and electrical weaknesses of available devices. A number of means of exciting acoustic waves from an electric source exist, piezo-electric transducers, such as quartz or tourmaline crystals, being the principal ones used in the highest frequency range thus far available, i.e., from 1 to 100 mc. These materials change their shape or volume under the influence of an electric field and transfer these displacements by mechanical contact with the material of which the delay element is comprised. Transducers of this type operate most effectively at their fundamental mechanical resonant frequency, and it has been customary to drive them at the corresponding electrical frequency—a feature which necessitates conversion of radar transmission frequencies, which may be in the kilomegacycle range, to a lower intermediate frequency before application to the delay or memory device.

The mechanical motion induced in the adjacent delay line material, e.g., fused quartz or mercury, is propagated therein as an ultrasonic wave for a period determined by the nature of the material and its shape, and when the wave reaches a second similar transducer, appropriately located, the signal is reconverted into electrical energy. The time delay introduced between the time of excitation of the first transducer and the arrival of the output signal at the second transducer may be utilized in a variety of ways. The constancy and simplicity of the ultrasonic delay line, as compared with other electronic devices, permits its use as a standard of time or as a measure of performance of electronic systems. In a radar system, for example, observance of the performance of the ultrasonic device at the radar's intermediate frequency affords a measure of the performance at the transmission frequency, and much useful information may be gained about the radar system itself and/or the surrounding region.

Inasmuch as the thickness of piezo-electric crystals varies inversely with their frequency, they are necessarily very thin if they are to be driven at their mechanical fundamental frequency, which, as noted earlier, is in the kilo-megacycle region in many present radar systems. Thicker crystals may be used and excited at an harmonic, but this is usually unsatisfactory since the power output of the crystal decreases as $n^{-2}$ where $n$ is the order of the harmonic. For example, an x-cut quartz crystal at 30 mc. is .0095 cm. thick and would have to resonate at its 100th harmonic to generate X-band (3,000 mc.) sound waves. Furthermore, the problem of attaining good mechanical contact between the transducer and the delay line at sound wavelengths of 0.0019 cm. is exceedingly difficult since the cements used to bond the transducer to the delay line material absorbs very highly causing objectionable losses.

Reference equipment of another type, commonly used in measuring the performance characteristics of radar systems, is the so-called "echo box," which generally comprises a large chamber with very low electrical damping into which the transmitted energy from the radar set is coupled and in which the signal resonates for an appreciable length of time. Observations of the deviation and character of the "echo box" output provide an indication of the performance of the radar system, particularly the magnetron. Devices of this type have enjoyed considerable utilization, but are not wholly acceptable because of their bulky nature, cost of their manufacture, their mechanical unstability, and their susceptance to mechanical and thermal variations. Moreover, the resonator does not always faithfully reproduce the initial pulse but generates a continuous reverberation which may be difficult to interpret.

With an appreciation of the foregoing disabilities of available delay line apparatus, the applicant has as a primary object of the present invention to provide a delay device operable at frequencies in the kilomegacycle range.

Another object of the invention is to provide a novel method of exciting a time delay medium.

Another object of the invention is to provide a delay line which is excited directly by electrical energy without the requirement for electro-mechanical transducers.

Another object of the invention is to provide a delay line which is very compact, simple to manufacture, and consequently of lower cost than heretofore available delay lines.

Another object of the invention is to provide an efficient system for testing radar system performance.

Still another object is to provide an energy storage system for testing the output of the magnetron of a radar system as it exists at the output terminals of the magnetron.

In the achievement of the foregoing objects, the invention contemplates direct excitation of the sound wave in an acoustic medium by electrostatic motion. Through proper selection of the acoustic medium, relatively large signals are obtainable from the electrostatic drive, and reasonable delay times may be achieved with a delay element of small physical size. When employed in the testing of the output of a magnetron, the acoustic medium is coupled to the wave guide section connecting the transmitter to the junction to which the antenna and receiver are connected whereby energy as it leaves the magnetron, is stored in the acoustic medium and released a predetermined time later for application to the receiver and analyser.

Further objects, features and advantages of the invention, and a better understanding thereof will be apparent from the following detailed description when considered with the accompanying drawings in which:

Fig. 1 is a schematic cross-section view of a conventional radar system;

Fig. 2 is a cross-sectional view of a radar system illustrating a preferred location of the delay line of the present invention for observing the performance of the system;

Fig. 3 is a fragmentary view of a portion of Fig. 2 illustrating a modification thereof;

Fig. 4 is a cross-sectional view illustrating another location of the delay line in a radar system; and Fig. 5 is a cross-sectional view illustrating still another location of the delay line in a radar system.

It has been shown experimentally that acoustic transmission losses are lower in single crystals than in fused or multiple-crystal material. For example, the "Q" of quartz crystal, measured at low frequencies, has values in the range between six and thirteen million, whereas the highest reported values for fused quartz is 340,000. Using the formula:

$$\alpha_f = \frac{Q}{8.686 f}$$

where $\alpha_f$ is the transmission coefficient in microseconds per db of loss, and $f$ is the frequency in megacycles, a quartz crystal at S-band frequency (3000 mc.) will transmit sound for 73 microseconds for each db of loss, while fused quartz would transmit for only 3.8 microseconds per db of loss. Other single crystals such as NaCl and KBr are commercially available and have a "Q" comparable to crystalline quartz. The path length for a 100 microsecond delay in a quartz crystal is roughly 15 inches, and somewhat less for other materials.

Attempts to excite a quartz crystal at S-band with piezoelectric transducers have been unsuccessful largely because the wavelength (.00033 cm.) is so small that the exciting crystal must operate on a high harmonic. The crystal surfaces cannot be maintained sufficiently flat and parallel, and any sound passing from the crystal into a solid must pass through a bond, which in general absorbs the energy to a great extent, and may introduce random phase distortion to lower the apparent signal.

The present invention contemplates the direct excitation of the sound wave in a solid medium by electrostatic motion, thereby eliminating the need for a transducer. It has heretofore been shown that electrostatic forces will produce mechanical motion directly, setting up compressional waves in a solid material without the necessity of a transducer. Calculations indicate that electrostatic transducers are about 40 db less efficient in the compressional mode than quartz crystals. The overall loss at S-band for a 100 microsecond delay in a single crystal therefore is about 80 db since the insertion loss of a conventional delay line is about 40 db into 1000 ohms. Conventional delay lines normally are operated at the I.F. frequency at the 6–10 volt level, whereas the present delay line is contemplated for operation at the S-band frequency of the R.F. pulse which is usually in the range of 1–3 kv.

In accordance with the invention, the delay line comprises a single element, preferably a single crystal of metal, or a dielectric crystal such as quartz, NaCl or the like, surface coated with a metal. Construction of metal, or surface coating with a metal insures that substantially the entire charge, as a result of electrostatic excitation, appears on the surface of the element causing mechanical motion to be induced within, and to extend into the material. If the dielectric crystal is uncoated the charge produced by the electrostatic excitation extends throughout the body, causing the induced mechanical motion to become extremely complicated and difficult to analyze. The opposite ends of the acoustic element are polished flat and parallel to within less than one-quarter wave length of light. The element is excited by the application of an electrostatic force to one face of the element, the induced charge in turn inducing an ultrasonic mechanical motion in the element which is propagated to the opposite face where it is reflected and returned to the excited face. The resulting mechanical movement for the first mentioned face generates an electromagnetic wave which is propagated into space or into the wave propagation circuitry of other devices with which the element is associated. Convenient delay times, i. e., the time between excitation and the return of the sound wave to the excited face, are obtainable with a single crystal about two inches in length.

Delay elements thus constructed and excited are adaptable to many applications, finding particular applicability in combination with radar wave guide systems wherein wave energies of sufficient magnitude to excite the crystal by electrostatic motion are encountered. The delay line element may be coupled to the wave guide system in a number of ways, it being important to select a location where the strongest signals will be generated in the acoustic element and where the delay line will not interfere with the normal operation of the radar system.

Referring to Fig. 1, the normal radar system comprises a transmitter 10, usually a magnetron connected by a wave guide 11 to an antenna 12, which radiates the energy into space. Returning signals, reflected from a distant object, are received by the same antenna and admitted to the receiver 13 through a T-R (transmit-receive) device 14 which prevents passage of the transmitted pulses to the receiver by breaking down at high fields and short circuiting wave guide 15, while remaining a good insulator in the presence of weak fields. Many types of T-R devices have been developed (see, for example, U.S. Patent No. 2,637,780 issued May 5, 1953, to Andrew Longacre), but all function in the manner generally described above.

It follows, that in order to receive the strongest impulses, the delay element should be located near the magnetron, preferably between the transmitter and the T-R unit, as illustrated in Fig. 2. The system is essentially the same as that illustrated in Fig. 1 except that the acoustic element 20, which may comprise a single metallic crystal, or a dielectric crystal having a metal coating, as above described, is positioned in a chamber or pocket 21, formed, for example, from a section of wave guide joined to one broad wall of wave guide section 11. The upper surface of element 20 is arranged flush with the inner wall so as not to introduce a discontinuity in the wave guide and is insulated therefrom by insulating material 22 disposed between the element and the walls of pocket 21. Assuming wave transmission in wave guide 11 is the T.E. mode, that is, with the electric vector of the oscillations in the direction of the short dimension of the wave guide as depicted at 23, the electrostatic field of the oscillations creates a charge on the upper surface of element 21. As mentioned earlier, this charge directly induces mechanical motion (an acoustic wave) within the element which travels to the lower end of the element where it is reflected back to the upper surface. There the mechanical displacement of the surface, which forms a part of the wave guide wall, induces a low level electromagnetic wave which is propagated along wave guide 11, and because it is of relatively low energy, passes through T-R device 14 to the receiver. This signal, which is, in effect, a sample of an individual pulse output of the transmitter, therefore arrives at the receiver a short time (determined by the delay introduced by element 20) after the transmission of said pulse into space, and may be analyzed to determine whether the magnetron is operating at the proper frequency.

Since induced electrostatic forces are always attractive, the amplitude of the acoustic signal, and consequently the generated electromagnetic wave, is rather small, and the electromagnetic wave is the second harmonic of the frequency of the magnetron, if the excitation described above is used. To overcome these disadvantages, it is necessary to bias the operation, preferably by application to element 20 of a direct current field which is greater than the R.F. field. Fig. 3 illustrates a suitable biasing arrangement comprising a flat conducting plate 25 disposed opposite the upper face of element 20 and parallel thereto and sufficiently spaced from the upper wall of wave guide 11 so as to avoid breakdown between the plate and the wall. A D.C. potential is applied between plate 25 and the upper conducting surface of element 20 by a suitable source, diagrammatically illustrated in the drawing as a battery 26, which produces a D.C. field in the direction shown. Inasmuch as the peak power output of radar transmitters is of the order of 1–3 kv., source 26 is preferably of a value in excess thereof, of the order of 5–10 kv. Excitation of the acoustic element, and the propagation therein is as above described except that the generated electromagnetic wave is of considerably greater magnitude and at the frequency of the transmitter. The energy is sufficiently low, however, that the signal does not break down the T-R device so the signal passes therethrough into the receiver.

Fig. 4 illustrates another arrangement for mounting the acoustic element in a wave guide system wherein the delay is determined by a simple traverse of the acoustic wave through the element. As in Fig. 2, the transmitter (not shown) is connected to the antenna (not shown) by main wave guide 30, and returned signals are admitted to the receiver through T-R device 31 positioned in branch wave guide 32. The delay element 33, which preferably has a metallic coating on each end is positioned in another branch wave guide 34, with its upper end flush with the inner wall of guide 30 and its lower end flush with the inner wall of wave guide 35. A D.C. biasing field is applied at the lower surface of element 33 as well as at the upper surface in the manner indicated in Fig. 3. The wave guide section 35 connects branch wave guide 34 to branch wave guide 32 at a point between T-R device 31 and the receiver. In this arrangement, the electrostatic field of the oscillations transmitted along main wave guide induces a charge on the upper surface of element 33, which in turn sets up an acoustic wave within the element 33. This wave is propagated through the element, which upon reaching the lower end causes a mechanical displacement of the lower face. With the application of a biasing voltage between the lower surface of element 33 and a conducting surface spaced therefrom (e.g., the element 25 of Fig. 3), electric charges of opposite-sign appear on the conducting surface of element 33 and the element 25. That is, the lower surface of element 33 may be charged negatively and the opposing surface of element 25 charged positively, or vice versa, depending upon the polarity of the biasing voltage. Upon displacement of the lower surface of element 33 by the acoustic wave set up by the excitation at the upper end, the electric charges on the lower surface will also be displaced, and since a displacement of an electric charge produces an electric current, an effective alternating current is passed between the lower surface of element 33 and the element 25. This current produces an electromagnetic wave in wave guide section 35 which is propagated into wave guide section 32 and into the receiver. This arrangement eliminates all discontinuity in main wave guide 30 and accordingly does not interfere in any way with the normal operation of the system.

If the T.M. mode of propagation, i.e., with the magnetic vector transverse to the guide and the electric vector having a longitudinal component, the delay element 40 may be positioned directly in the main wave guide 41, as shown in Fig. 5, and the R.F. pulse from the transmitter sent through it. The component of the electric vector in the T.M. mode normal to the left face 42 of element 41 induces an acoustic wave in essentially the manner described above, which is propagated through the element and produces mechanical displacement of the left face 43. This mechanical displacement induces an electromagnetic wave which is propagated through the T-R device 44 into the receiver (not shown). Delay element 41 is preferably formed of fused quartz so that the signals from the transmitter may be propagated thereto with minimum reflection. As a result, the "main bang" is sent through the element 41, and as it passes, excites an acoustic wave therein which emanates from face 43 following the main bang by a period determined by the delay introduced by the element.

From the foregoing description it will be apparent that the present invention provides a delay line which is extremely simple; in fact, there is but a single element. Accordingly, it may compactly be combined in electronic systems, and is relatively simple to manufacture. When used in the testing of radar systems, there is no intervening element between the delay element and the magnetron being tested, as with delay lines using transducers.

In addition to the illustrated arrangements of the acoustic element in a radar system, modification thereof and other arrangements will be apparent to persons skilled in the art. Accordingly, the disclosed embodiments are intended to be construed as illustrative only and that the invention be limited only by the appended claims.

What is claimed is:

1. In a radar system including a transmitter coupled to an antenna by a main wave guide and a receiver coupled to said antenna by a branch wave guide joined to said main wave guide, apparatus for measuring the performance of said system comprising a conducting pocket joined to said main wave guide between said transmitter and the junction of said branch wave guide and said main wave guide, a delay element formed of a single crystal having conducting end surfaces positioned in said pocket with one end surface flush with the inner wall of said main wave guide, said delay element being excitable directly by the electrostatic forces of the oscillations propagated through said main wave guide from said transmitter to induce mechanical motion in said element, the mechanical motion being propagated within said element and reflected from the other end surface and returned to said one end surface, the resulting mechanical movement of said one face generating an electromagnetic wave in said main wave guide having a frequency which is an integral multiple of the frequency of said oscillations and delayed in time from the exciting signal by an interval dependent on the acoustic propagation characteristics of said element.

2. Apparatus in accordance with claim 1 wherein said element comprises a single crystal of a metal.

3. Apparatus in accordance with claim 1 wherein said element comprises a single crystal of dielectric material having its end surfaces coated with a metal.

4. Apparatus in accordance with claim 1 wherein said element comprises a single crystal of quartz having its end surfaces coated with a metal.

5. In a radar system including a transmitter coupled to an antenna by a main wave guide and a receiver joined to said antenna by a branch wave guide joined to said main wave guide, apparatus for measuring the performance of said system comprising, a first wave guide section perpendicularly joined to said main wave guide between said transmitter and the junction of said main wave guide and said branch wave guide, a second wave guide section perpendicularly joined at one end to said first wave guide section and at the other end to said branch wave guide, and a delay element having parallel end faces positioned in said first wave guide section with one end face flush with the inner wall of said main wave guide and the other end face flush with the inner wall of said second wave guide section, said delay element being excitable directly by the electrostatic field of the energy propagated in said main wave guide from said transmitter to induce mechanical motion within said element which is propagated to said other face, the resulting mechanical movement of said other face generating an electromagnetic wave in said second wave guide section having a frequency which is an integral multiple of the frequency of the energy propagated in said main wave guide and delayed from the exciting signal by the time required for the induced mechanical motion to be propagated through said element.

6. Apparatus in accordance with claim 5 wherein said element comprises a single crystal of a metal.

7. Apparatus in accordance with claim 5 wherein said element comprises a single crystal of dielectric material having its end surfaces coated with a metal.

8. Apparatus in accordance with claim 5 wherein said element comprises a single crystal of quartz having its end surfaces coated with a metal.

9. In a wave translation system including a wave guide adapted to have wave energy propagated therein, a unitary delay element having parallel conducting end faces, said delay element being coupled to said wave guide and so arranged that the electrostatic field of said wave energy induces a charge on one conducting end face of said element, said charge, in turn, inducing mechanical motion having a frequency which is an integral multiple of the frequency of said wave energy within said element which is propagated therethrough to said other end face.

10. In a wave translation system including a wave guide adapted to have wave energy propagated therein, a unitary delay element having parallel conducting end faces, said delay element being coupled to said wave guide and so arranged that the electrostatic field of said wave energy induces a charge on one conducting end face of said element, said charge, in turn, inducing ultrasonic mechanical motion within said element which is propagated therethrough to said other end face where it is reflected and returned through said element to said one face, the resulting mechanical movement of said one face generating an electromagnetic wave in said wave guide having a frequency which is an integral multiple of the frequency of said wave energy and delayed in time from the exciting wave energy.

11. In a wave translation system including a wave guide adapted to have wave energy propagated therein, a unitary solid delay element having parallel conducting end faces, said delay element being coupled to said wave guide and so arranged that the electrostatic field of said wave energy induces a charge on one conducting end face of said element said charge, in turn, inducing ultrasonic mechanical motion within said element which is propagated therethrough to said other end face, the resulting mechanical movement of said other face generating an electromagnetic wave having a frequency which is an integral multiple of the frequency of said wave energy and delayed in time from the exciting wave energy.

12. Apparatus for producing an electromagnetic signal delayed in time from an exciting signal comprising, a delay element formed of a single crystal of quartz having parallel end faces coated with a metal, and means coupling said exciting signal to one end face of said element, the electrostatic field of said exciting signal inducing a charge on said one end face which, in turn, induces ultrasonic mechanical motion within said element which is propagated to the other face, the resulting mechanical movement of said other face generating an electromagnetic wave delayed from the exciting signal by a time interval determined by the propagation characteristic of said element.

13. Apparatus for producing an electromagnetic signal delayed in time from an exciting signal comprising, a delay element having parallel end faces, and means coupling said exciting signal to one end face of said element arranged whereby the electric vector of said exciting signal has a component normal to said one end face, the electric vector of said exciting signal directly inducing mechanical motion in said element which is propagated therethrough to the other end face, the resulting mechanical movement of said other end face generating an electromagnetic wave having a frequency which is an integral multiple of the frequency of said exciting signal and delayed in time from said exciting signal.

14. In combination, a wave guide adapted to have kilomegacycle wave energy propagated therein, a delay element formed of a single crystal and having parallel conducting end faces, said delay element being coupled to said wave guide with one end face flush with the inner wall of said wave guide and so arranged that the electric vector of said wave energy has a component normal to said one end face, and means positioned within said wave guide opposite said one end face and spaced therefrom for producing a biasing direct electric field normal to said one end face, the electrostatic field of said wave energy inducing kilomegacycle mechanical motion within said element which is propagated therethrough to the other end face, the resulting mechanical movement of said other end face having a frequency equal to the frequency of the exciting signal and being delayed in time from the exciting signal.

15. In combination, a wave guide adapted to have wave energy propagated therein at kilomegacycle frequencies, a delay element formed of a single crystal and having parallel conducting end faces, said element being coupled to said wave guide with one end face flush with an inner wall of said wave guide and so arranged that the electric vector of said wave energy has a component normal to said one end face, a conducting plate disposed within said wave guide opposite said one end face and spaced therefrom, and a source of direct potential connected between said plate and said one end face to provide a biasing direct electric field normal to said one end face, the electrostatic motion of said wave energy inducing mechanical motion in said crystal at the frequency of said wave energy which is propagated therethrough to the other end face and reflected thereby and returned to said one face, the resulting mechanical movement of said one end face generating an electromagnetic wave in said wave guide at the frequency of said wave energy and delayed in time therefrom.

16. Apparatus in accordance with claim 15 wherein said element comprises a single crystal of a metal.

17. Apparatus in accordance with claim 15 wherein said element comprises a single crystal of quartz having its end faces coated with a metal.

18. In combination, a main wave guide, means for coupling electromagnetic energy of predetermined frequency to said main wave guide, a branch wave guide joined to said main wave guide, a delay element comprising a member formed of a material having a high mechanical "Q" and having parallel end faces, coupled to said main wave guide and arranged whereby the electrostatic field of said wave energy induces a charge on one end face of said element, said charge, in turn, inducing mechanical motion within said element at a frequency which is an integral multiple of said predetermined frequency which is propagated therethrough to the other end face, the resulting mechanical movement of said other end face being delayed in time from the exciting signal.

19. In combination, a main wave guide, generator means coupled to said main wave guide for coupling wave energy thereto at a predetermined frequency, a branch wave guide joined to said main wave guide, a delay element comprising a member formed of a material having a high mechanical "Q" and having parallel conducting end faces, said delay element being coupled to said main wave guide at a point between said generator means and said branch wave guide with one end surface flush with the inner wall of said main wave guide, the electrostatic field of said main wave guide energy directly inducing a charge on said one end face of said element, said charge, in turn, inducing mechanical motion within said element having a frequency which is an integral multiple of said predetermined frequency which is propagated to said other face, the resulting mechanical movement of said other face generating a signal at said last-mentioned frequency delayed in time from the main wave guide signal, and means coupling said delayed signal to said branch wave guide.

20. Apparatus in accordance with claim 19 and means positioned within said main wave guide opposite said one end face of said element and spaced therefrom for producing a biasing direct electric field normal to said one end face.

21. Apparatus in accordance with claim 19 and a conducting plate disposed within said main wave guide opposite said one end face and parallel therewith, and a source of direct potential connected between said plate and said one end face to provide a biasing direct electric field normal to said one end face.

22. Apparatus in accordance with claim 19 wherein said delay element is formed of a single crystal.

23. In combination, a main wave guide, a generator of wave energy of predetermined frequency coupled to said main wave guide, a branch wave guide joined to said main wave guide, a conducting pocket joined to said main wave guide between said generator and the junction of said branch wave guide and said main wave guide, a delay element comprising a member formed of a material having high mechanical "Q" and having conducting end surfaces, said delay element being positioned in said pocket with one end surface flush with the inner wall of said main wave guide, the electrostatic field of the wave energy in said main wave guide directly inducing a charge on said one end surface of said element, said charge in turn inducing mechanical motion in said element at a frequency which is an integral multiple of said predetermined frequency which is propagated to said other end surface where it is reflected and returned to said one end surface, the resulting mechanical movement of said one end surface generating a wave signal in said main wave guide delayed in time from the exciting signal by an interval dependent on the acoustic propagation characteristics of said element.

24. Apparatus in accordance with claim 23 and means positioned within said main wave guide opposite said one end surface of said element and spaced therefrom for producing a biasing direct electric field normal to said one end surface, whereby said delayed signal has said predetermined frequency.

25. In combination, a main wave guide, wave generating means for coupling electromagnetic energy of predetermined frequency to said main wave guide, a branch wave guide joined to said main wave guide, a first wave guide section joined at one end to said main wave guide between said wave generating means and the junction of said main wave guide and said branch guide, a second wave guide section joined at one end to the other end of said first wave guide section and at the other end to said branch wave guide, and a delay element comprising a member formed of a material having a high mechanical "Q" and having parallel conducting end surfaces, said delay element being positioned in said first wave guide section with one end surface flush with the inner wall of said main wave guide and the other end surface flush with the inner wall of said second wave guide section, said one end surface of said delay element being excited directly by the electrostatic field of the energy propagated in said main wave guide to induce mechanical motion within said crystal at a frequency which is an integral multiple of said predetermined frequency which is propagated to said other end surface, the resulting mechanical movement of said other surface generating an electromagnetic wave in said second wave guide section having said last-mentioned frequency delayed from the exciting signal by the time required for the induced mechanical motion to be propagated through said element.

26. Apparatus in accordance with claim 25 wherein said member is a block of dielectric material having at least its end surfaces coated with a metal.

27. In combination, a main wave guide, wave generating means for coupling electromagnetic energy of predetermined frequency to said main wave guide, a branch wave guide joined to said main wave guide, and a delay element comprising a member formed of a material having a high mechanical "Q" and having parallel conducting end surfaces, said member being positioned in said main wave guide between said wave generating means and the junction of said main wave guide with said branch wave guide with said end surface transverse to the direction of propagation of energy in said main wave guide, the electrostatic field of said wave energy inducing a charge in one end surface of said element which, in turn, induces mechanical motion at a frequency which is an integral multiple of said predetermined frequency in said member which is propagated to the other end surface, the resulting mechanical movement of said other end surface generating an electromagnetic wave delayed in time from the exciting signal.

References Cited in the file of this patent

UNITED STATES PATENTS

| 2,448,623 | Rose | Sept. 7, 1948 |
| 2,643,280 | Bernier | June 23, 1953 |
| 2,669,666 | Mason | Feb. 16, 1954 |
| 2,773,996 | Slater | Dec. 11, 1956 |